J. B. BURDETT.
WELDING TORCH.
APPLICATION FILED NOV. 8, 1920.
1,432,528. Patented Oct. 17, 1922.
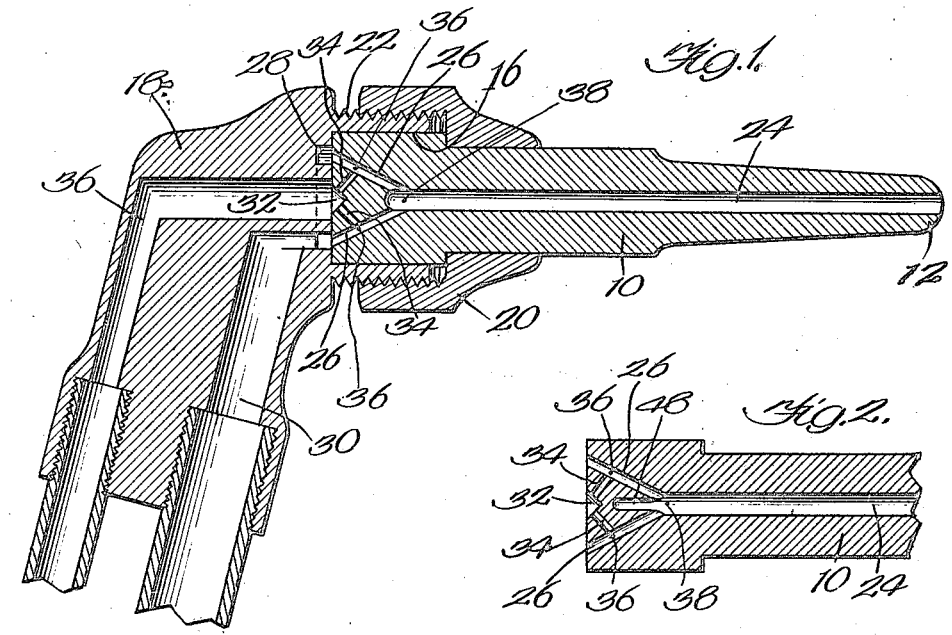
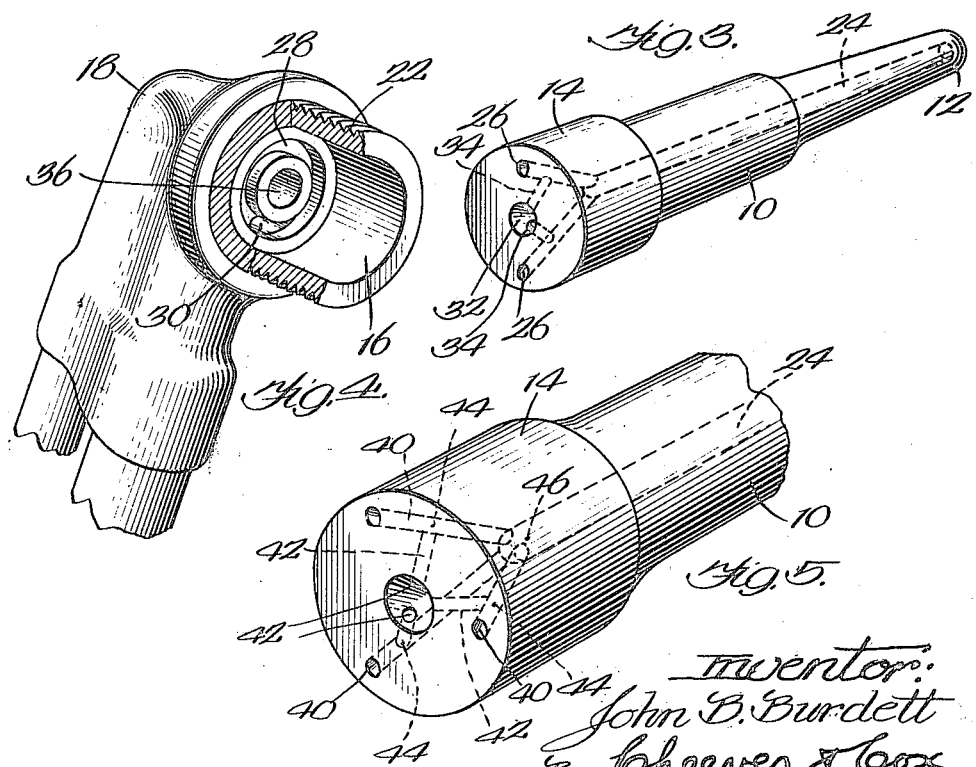
Inventor:
John B. Burdett
By Cheever & Cox
Att'ys Patented Oct. 17, 1922.

1,432,528

UNITED STATES PATENT OFFICE.

JOHN B. BURDETT, OF GLENCOE, ILLINOIS, ASSIGNOR TO BURDETT MANUFACTURING COMPANY, OF CHICAGO, ILLINOIS, A CORPORATION OF DELAWARE.

WELDING TORCH.

Application filed November 8, 1920. Serial No. 422,527.

*To all whom it may concern:*

Be it known that I, JOHN B. BURDETT, a citizen of the United States, residing at Glencoe, in the county of Cook and State of Illinois, have invented a certain new and useful Improvement in Welding Torches, of which the following is a specification.

This invention relates to welding torches, that is to say devices in which two gases, usually acetylene and oxygen or hydrogen and oxygen are mixed and then burned to produce an intensely hot flame for use in welding and the like. It is well understood in the art that where such gases are burned together without the most thorough mixing before ignition more or less disastrous results occur in the welding operation, the character of those results depending upon which one of the gases is in excess of the amount required for a proper combustible mixture. The object of this invention is to provide a mechanism by which the two gases are given more than one mixing before their final delivery at the normal point of combustion. The invention consists in a novel construction of unitary mixing block, in the particular case here illustrated a tip or nozzle for torches of this kind, capable of reaching the foregoing objects and to produce this device in a very simple and economical manner. It further consists in combining with the preferred form of device, a supplemental construction which tends to promptly extinguish any flame which may creep up in the nozzle; and in other features and details of construction hereafter more fully described in the specification and claims.

Referring to the drawings in which like numerals designate the same parts throughout the several views:—

Figure 1 is a sectional detail view of the preferred form of nozzle of this invention in working position on a conventional form of torch.

Figure 2 is a sectional view of a modified form of nozzle removed from the torch.

Figure 3 is a perspective view of the nozzle of Figure 1 removed from the torch.

Figure 4 is a perspective view of the face of the torch in Figure 1, certain parts being shown in section.

Figure 5 is a perspective view of a modified form of the structure of Figure 1 in which an increased number of gas mixings are provided.

The simplest form of the mixing block or nozzle 10 shown in Figures 1 and 3, comprises an elongated piece of metal taking the form of generally a conical member provided at its right hand end with a relatively small tip 12 and its left hand end with a cylindrical enlarged portion 14 adapted to fit into a cylindrical recess 16, of ordinary construction, in the delivery end of a torch head 18 and be secured in place in the usual manner by the application of a nut 20 to the screw threads 22. Nozzle 10 is perforated through its center in a central, relatively large, passage 24 leading from the tip end 12 to a point a comparatively short distance from the opposite end of the nozzle, where it divides into two diagonal outwardly inclined passages 26 adapted to interfit with an annular recess 28 formed in the end of head 18 and supplied with gas, usually oxygen through a passage 30 in the head 18. In the left hand end of the nozzle 10 there is provided a central indentation 32 opening into two diagonal passages 34 leading into the passages 26 approximately midway of their lengths and at approximately right angles thereto. This indentation 32 and these passages 34 are arranged to register with another gas passage 36 in the head 18 through which a suitable gas usually acetylene is provided. Passages 34 and 26 are not of equal size, but are proportioned, in cross sectional areas, so that with given predetermined pressures and gases substantially the correct quantity of one gas will flow through each passage 34 to mix with the amount of the other gas which is moving from pipe 30 through passages 26 to the central passage 24. In actual practice on one size the acetylene passage is made with say a No. 60 drill and the oxygen with a No. 56 drill. On other sizes of nozzle the drill numbers will differ by four points. When the device is constructed and arranged in this way and properly supplied with gas there should be a proper mixture of the two gases at points 36, of intersection of each passage 34, and its adjacent passage 26, from which point down to the entrance of passage 24 the mixed gases travel until at point 38 the mixed gases delivered by each of the two passages 26 are again and finally mixed as they flow into passages 24 to tip 12 where they are ultimately burned and consumed.

The thoroughness of mixing of the streams of gas which meet at points 26 is materially assisted by the passages 24 and 26 being at approximately right angles to each other.

Again, the thoroughness of mixing at point 38 is assisted by the fact that the three passages 26 are inclined sharply across each other so that the stream of gas from each passage must of necessity break into and partly cross the other two streams in getting into passage 24.

By thoroughly mixing gases at the two points 36 and then combining the resulting mixtures at the points 38 a more complete and satisfactory mixing of the gases is obtained at the delivery tip 12 than has heretofore been possible in any structure of the prior art.

The nozzle of Figure 5 differs from that of Figures 1 and 3 only in that three diagonal passages 40 corresponding to passages 26, are provided, each entered by a diagonal passage 42, corresponding to a passage 34, with the result that the initial mixing of the gases takes place at three points 44 instead of at two points 36 in the first described structure, with resulting more thorough mixture at the main mixing point 46 corresponding with point 38. By further increasing the number of such preliminary mixing points 44 through the installation of additional diagonal passages, still more satisfactory mixing might be obtained.

In the case of either one of the structures described the passage of burning gas in the main central passage of the nozzle, as 24, up to the diagonal passages may be prevented by installing adjacent to and preferable in line with passage 24 a supplemental storage gas chamber 48 in which a quantity of mixed gas accumulate during the normal operation of the device to be fired whenever the flame travels from right to left through passage 24, far enough to reach it, with the result that, under well known principles, the small quantity of gas in chamber 48 explodes and becomes a large volume which drives all the burning gas from left to right out of the central passage of the nozzle, thus extinguishing the flame.

The mixing mechanism is here shown inserted when the nozzle joins the torch head but such location is not in any way a limitation on the invention. An example of locating the mixing device in the center of the torch is shown, described and claimed in a companion application, filed February 6, 1922.

Having thus described my invention what I claim as new and desire to secure by Letters Patent is:—

1. In mechanism of the class described a one piece nozzle having one longitudinal central perforation through which the gas is delivered to the burning tip and means within the nozzle more than half the nozzle length from the burning tip delivering to said main perforations two streams of mixed gas, there being also provided means wholly within the nozzle itself adjacent to the intake end for forming each of said streams of mixed gas out of two component gases.

2. A nozzle of the class described having a tip end and a supply end there being a main passage leading from the tip end to a point near the supply end and there dividing into a plurality of angular passages leading out to different separated points on the supply end, there being also passages from a point on the supply end inside of said first diagonal passages, leading into said diagonal passages and approximtely at right angles thereto for the purposes set forth.

3. In mechanism of the class described a tapering nozzle member centrally perforated from its tip to a point inside it near its opposite end and there angularly perforated in two or more diagonal passages leading outward to near the outer edge of the supply end and also perforated from a point at approximately the center of the supply end in passages leading into said diagonal passages for the purposes set forth.

4. In mechanism of the class described a nozzle having a central perforation delivering at one point for the burning of gas there being also within the nozzle itself a plurality of separate passages, adapted to supply gas to the central passage there being also a plurality of supplemental gas passages adapted to supply gas to the second mentioned gas passages, intermediate of their lengths within the nozzle, the first mentioned passages being so located that gas of one kind may be supplied to them and the second set of supplemental gas may be supplied to each of them, with resulting mixture of said gases first at the intersections of respective supplemental gas passages and finally on entering the central perforation for the purposes set forth.

5. In mechanism of the class described, a nozzle comprising one single piece of perforated metal having a supply end and a gas burning or tip end, there being at the supply end a plurality of outwardly inclined gas passages leading from one point in said supply end towards the inside of the nozzle, there being around the outer edge of the supply end a plurality of inwardly inclined gas passages terminating at their inner ends in a common passage leading through the nozzle to the tip end of the nozzle, each of said second mentioned inclined passages being entered before it reaches the main common passage by one of said first mentioned inclined passage ways.

6. In a welding torch, a mixing block detachably insertable in a torch mechanism in the path of two gases to be mixed and burned by the torch, the same having a tip end and a supply end, there being a single central passage leading from the tip end to a point near the supply end and there dividing into more than two angular passages leading out of the block at different separated points on the supply end, there being also passages leading from a point on the supply end of the block approximately equally distant from the entrance openings of said first mentioned angular passages into said angular passages, for the purposes set forth.

7. In a welding torch, a mixing block detachably insertable in a torch mechanism in the path of two gases to be mixed and burned by the torch, the same having a tip end and a supply end, there being a single central passage leading from the tip end to a point near the supply end and there dividing into more than two angular passages leading out of the block at different separated points on the supply end, there being also passages leading from a point on the supply end of the block approximately equally distant from the entrance openings of said first mentioned angular passages into said angular passages and approximately at right angles thereto, for the purposes set forth.

8. A torch provided within it with two aligned passages (32 and 24) separated at one point by an obstruction of imperforate material, there being communication around the obstruction through upwards of two angled passages (26—34) each provided intermediate of its ends with means for admitting outside gas, means for simultaneously supplying one gas at said admission points, and means supplying gas to one of the first two passages whereby a mixture of the two gases is delivered by each of the angled passages to the second of the first mentioned passages for the purposes set forth.

In witness whereof, I have hereunto subscribed my name in the presence of a witness.

JOHN B. BURDETT.

Witness:
   DWIGHT B. CHEEVER.